US012502823B2

(12) United States Patent
Wang et al.

(10) Patent No.: US 12,502,823 B2
(45) Date of Patent: Dec. 23, 2025

(54) COLOR IMAGE PRINTING BY POLYMER-ASSISTED PHOTOCHEMICAL DEPOSITION

(71) Applicants: Chao Wang, Chandler, AZ (US); Shinhyuk Choi, Tempe, AZ (US); Yu Yao, Chandler, AZ (US); Jiawei Zuo, Tempe, AZ (US)

(72) Inventors: Chao Wang, Chandler, AZ (US); Shinhyuk Choi, Tempe, AZ (US); Yu Yao, Chandler, AZ (US); Jiawei Zuo, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 378 days.

(21) Appl. No.: 18/154,257

(22) Filed: Jan. 13, 2023

(65) Prior Publication Data

US 2023/0219284 A1 Jul. 13, 2023

Related U.S. Application Data (60) Provisional application No. 63/299,312, filed on Jan. 13, 2022.

(51) Int. Cl.
*B29C 64/106* (2017.01)
*B29C 35/08* (2006.01)
*B33Y 10/00* (2015.01)
*B33Y 70/10* (2020.01)

(52) U.S. Cl.
CPC ........ *B29C 64/106* (2017.08); *B29C 35/0805* (2013.01); *B33Y 10/00* (2014.12); *B33Y 70/10* (2020.01); *B29C 2035/0827* (2013.01)

(58) Field of Classification Search
CPC ...................................................... B33Y 10/00
See application file for complete search history.

(56) References Cited

U.S. PATENT DOCUMENTS

| 6,762,237 | B2 * | 7/2004 | Glatkowski | ............ B82Y 10/00 |
| | | | | 524/495 |
| 8,586,173 | B2 * | 11/2013 | Yializis | .................. B82Y 20/00 |
| | | | | 428/220 |
| 10,494,721 | B1 * | 12/2019 | Robinson | ............... C23C 18/208 |
| 2012/0244322 | A1 * | 9/2012 | Morhard | ............. C23C 18/1667 |
| | | | | 977/773 |
| 2019/0262897 | A1 * | 8/2019 | Zhao | ........................ B22F 10/12 |
| 2020/0223999 | A1 * | 7/2020 | Malic | ....................... G03F 7/031 |

FOREIGN PATENT DOCUMENTS

KR         20210062137 A   *   5/2021              C23C 28/36

OTHER PUBLICATIONS

Byun et al. KR20210062137 translation. 2021 (Year: 2021).*

(Continued)

*Primary Examiner* — Cachet I Proctor
(74) *Attorney, Agent, or Firm* — Fish & Richardson P.C.

(57) ABSTRACT

A structural color image includes a metallic layer, a nanocomposite film, and a dielectric layer between and in direct contact with the metallic layer and the nanocomposite film. The metallic layer reflects visible light. The nanocomposite film reflects visible light and includes metallic nanoparticles in a polymeric material.

20 Claims, 5 Drawing Sheets

(56) References Cited

OTHER PUBLICATIONS

Albaladejo, Silvia, Manuel I. Marqués, and Juan José Sáenz. "Light control of silver nanoparticle's diffusion." Optics express 19.12 (2011): 11471-11478.

Al-Ramadhan, Zainab A., Jehan A. Salman, and H. A. K. Humd. "Optical and morphological properties of (PVA-PVP-Ag) nanocomposites." Int. J. Sci. Res 5 (2016): 1828-1836.

Banisadr, Seyedali, Adebola Oyefusi, and Jian Chen. "A versatile strategy for transparent stimuli-responsive interference coloration." ACS applied materials & interfaces 11.7 (2019): 7415-7422.

Bardini, Luca, et al. "Electrochemical polymerization of allylamine copolymers." Langmuir 29.11 (2013): 3791-3796.

Barma, M. U. S. T. A. N. S. I. R., and V. Subrahmanyam. "Optical absorption in small metal particles." Journal of Physics: Condensed Matter 1.41 (1989): 7681.

Barman, Bidyut, et al. "Formation of plasmonic silver nanoparticles using rapid thermal annealing at low temperature and study in reflectance reduction of Si surface." Advances in Natural Sciences: Nanoscience and Nanotechnology 8.3 (2017): 035010.

Barrie, James D., et al. "Control of stress in protected silver mirrors prepared by plasma beam sputtering." Applied optics 50.9 (2011): C135-C140.

Chen, Weiqiang, et al. "Ultra-thin ultra-smooth and low-loss silver films on a germanium wetting layer." Optics express 18.5 (2010): 5124-5134.

Chen, Ke, et al. "Multicolor printing using electric-field-responsive and photocurable photonic crystals." Advanced Functional Materials 27.43 (2017): 1702825.

Chou, Namsun, Jinmo Jeong, and Sohee Kim. "Crack-free and reliable lithographical patterning methods on PDMS substrate." Journal of Micromechanics and Microengineering 23.12 (2013): 125035.

Coronado, Eduardo A., and George C. Schatz. "Surface plasmon broadening for arbitrary shape nanoparticles: A geometrical probability approach." The Journal of chemical physics 119.7 (2003): 3926-3934.

Dahmouchène, Nora, et al. "Silver nanoparticles embedded in polymer matrices-a FTIR-SE study." physica status solidi c 5.5 (2008): 1210-1214.

Ellenbogen, Tal, Kwanyong Seo, and Kenneth B. Crozier. "Chromatic plasmonic polarizers for active visible color filtering and polarimetry." Nano letters 12.2 (2012): 1026-1031.

Fang, Yinchun, et al. "Eco-friendly colorization of textile originating from polydopamine nanofilm structural color with high colorfastness." Journal of Cleaner Production 295 (2021): 126523.

Furukawa, Shinya, Toshiyuki Masui, and Nobuhito Imanaka. "Synthesis of new environment-friendly yellow pigments." Journal of alloys and compounds 418.1-2 (2006): 255-258.

Hail, Claudio U., et al. "A plasmonic painter's method of color mixing for a continuous red-green-blue palette." ACS nano 14.2 (2020): 1783-1791.

Keshavarz Hedayati, Mehdi, and Mady Elbahri. "Review of metasurface plasmonic structural color." Plasmonics 12.5 (2017): 1463-1479.

Hodgson, Norman, et al. "Laser Resonators and Beam Propagation: Fundamentals, Advanced Concepts, Applications." vol. 108. Springer, 2005.

Huang, Yun, et al. "Polarization-controlled bifunctional metasurface for structural color printing and beam deflection." Optics letters 45.7 (2020): 1707-1710.

Jang, Jaehyuck, et al. "Spectral modulation through the hybridization of Mie-scatterers and quasi-guided mode resonances: realizing full and gradients of structural color." ACS nano 14.11 (2020): 15317-15326.

Jeong, Eunwook, et al. "Minimizing optical loss in ultrathin Ag films based on Ge wetting layer: Insights on Ge-mediated Ag growth." Applied Surface Science 528 (2020): 146989. 11 pages.

Jiran, E., and C. V. Thompson. "Capillary instabilities in thin, continuous films." Thin Solid Films 208.1 (1992): 23-28.

Kajtár, G., et al. "Theoretical model of homogeneous metal-insulator-metal perfect multi-band absorbers for the visible spectrum." Journal of Physics D: Applied Physics 49.5 (2016): 055104. 6 pages.

Kats, Mikhail A., et al. "Enhancement of absorption and color contrast in ultra-thin highly absorbing optical coatings." Applied Physics Letters 103.10 (2013).

Kats, Mikhail A., et al. "Optical absorbers based on strong interference in ultra-thin films." Laser & Photonics Reviews 10.5 (2016): 735-749.

Kenanakis, G., et al. "Perfect absorbers based on metal-insulator-metal structures in the visible region: a simple approach for practical applications." Applied Physics A 123 (2017): 1-6.

Kim, Soo-Jung, et al. "Solution-processable nanocrystal-based broadband Fabry-Perot absorber for reflective vivid color generation." ACS applied materials & interfaces 11.7 (2019): 7280-7287.

Kim, Do Yoon, et al. "Electroactive soft photonic devices for the synesthetic perception of color and sound." Advanced Materials 31.2 (2019): 1804080. 6 pages.

Kim, Minkyung, et al. "Active color control in a metasurface by polarization rotation." Applied Sciences 8.6 (2018): 982. 8 pages.

Lee, In-Ho, et al. "Selective photonic printing based on anisotropic Fabry-Perot resonators for dual-image holography and anti-counterfeiting." Optics Express 27.17 (2019): 24512-24523.

Lee, Junho, et al. "High-purity reflective color filters based on thin film cavities embedded with an ultrathin Ge 2 Sb 2 Te 5 absorption layer." Nanoscale Advances 2.10 (2020): 4930-4937.

Li, Zhongyang, Serkan Butun, and Koray Aydin. "Large-area, lithography-free super absorbers and color filters at visible frequencies using ultrathin metallic films." Acs Photonics 2.2 (2015): 183-188.

Li, Zhibo, Alasdair W. Clark, and Jonathan M. Cooper. "Dual color plasmonic pixels create a polarization controlled nano color palette." Acs Nano 10.1 (2016): 492-498.

Lim, Kevin TP, et al. "Holographic colour prints for enhanced optical security by combined phase and amplitude control." Nature communications 10.1 (2019): 25. 8 pages.

Liu, Xin, Zhao Huang, and Jianfeng Zang. "All-dielectric silicon nanoring metasurface for full-color printing." Nano Letters 20.12 (2020): 8739-8744.

Nagasaki, Yusuke, Masafumi Suzuki, and Junichi Takahara. "All-dielectric dual-color pixel with subwavelength resolution." Nano letters 17.12 (2017): 7500-7506.

Nam, Hyunmoon, et al. "Inkjet printing based mono-layered photonic crystal patterning for anti-counterfeiting structural colors." Scientific reports 6.1 (2016): 30885. 9 pages.

Niklasson, Goran A., C. G. Granqvist, and O. Hunderi. "Effective medium models for the optical properties of inhomogeneous materials." Applied Optics 20.1 (1981): 26-30.

Odintsova, G. V., et al. "High-resolution large-scale plasmonic laser color printing for jewelry applications." Optics express 27.3 (2019): 3672-3681.

Rana, Ahsan Sarwar, et al. "Engineering the absorption spectra of thin film multilayer absorbers for enhanced color purity in CMY color filters." Optical Materials Express 10.2 (2020): 268-281.

Rao, Yang, et al. "A precise numerical prediction of effective dielectric constant for polymer-ceramic composite based on effective-medium theory." IEEE Transactions on Components and Packaging Technologies 23.4 (2000): 680-683.

Reshetnyak, V. Yu, et al. "Effective medium theory for anisotropic media with plasmonic core-shell nanoparticle inclusions." The European Physical Journal Plus 133.9 (2018): 373.

Daqiqeh Rezaei, Soroosh, et al. "Tunable, cost-effective, and scalable structural colors for sensing and consumer products." Advanced Optical Materials 7.20 (2019): 1900735. 8 pages.

Raj Shrestha, Vivek, et al. "Polarization-tuned dynamic color filters incorporating a dielectric-loaded aluminum nanowire array." Scientific reports 5.1 (2015): 12450. 10 pages.

Sun, Shang, et al. "All-dielectric full-color printing with TiO2 metasurfaces." ACS nano 11.5 (2017): 4445-4452.

Vodnik, Vesna, et al. "Silver/polystyrene nanocomposites: optical and thermal properties." Polymer composites 33.5 (2012): 782-788.

Wang, Hao, et al. "Full color generation using silver tandem nanodisks." ACS nano 11.5 (2017): 4419-4427.

(56) References Cited

OTHER PUBLICATIONS

Wang, Yasi, et al. "Fabrication of Fabry-Perot-cavity-based monolithic full-color filter arrays using a template-confined micro-reflow process." Journal of Micromechanics and Microengineering 29.2 (2019): 025008. 7 pages.

Wankhede, Y. B., et al. "Synthesis and characterization of silver nanoparticles embedded in polyaniline nanocomposite." Advanced Materials Letters 4.1 (2013): 89-93.

Wu, Yi-Kuei Ryan, et al. "Angle-insensitive structural colours based on metallic nanocavities and coloured pixels beyond the diffraction limit." Scientific reports 3.1 (2013): 1194. 6 pages.

Xu, Ting, et al. "Plasmonic nanoresonators for high-resolution colour filtering and spectral imaging." Nature communications 1.1 (2010): 59. 5 pages.

Yakovlev, Aleksandr V., et al. "Inkjet color printing by interference nanostructures." ACS nano 10.3 (2016): 3078-3086.

Yakovlev, Aleksandr V., et al. "Inkjet printing of TiO2/AlOOH heterostructures for the formation of interference color images with high optical visibility." Scientific Reports 6.1 (2016): 37090. 12 pages.

Yang, Zhengmei, et al. "Reflective color filters and monolithic color printing based on asymmetric Fabry-Perot cavities using nickel as a broadband absorber." Advanced Optical Materials 4.8 (2016): 1196-1202.

Yang, Zhengmei, et al. "Microscopic interference full-color printing using grayscale-patterned Fabry-Perot resonance cavities." Advanced Optical Materials 5.10 (2017): 1700029. pp. 1-9.

Yang, Bo, et al. "Structural colors in metasurfaces: principle, design and applications." Materials Chemistry Frontiers 3.5 (2019): 750-761.

Yang, Wenhong, et al. "All-dielectric metasurface for high-performance structural color." Nature communications 11.1 (2020): 1864. 8 pages.

Yu, You, et al. "Polymer-Assisted Metal Deposition (PAMD): A Full-Solution Strategy for Flexible, Stretchable, Compressible, and Wearable Metal Conductors." Advanced Materials 26.31 (2014): 5508-5516.

Zhang, Fei, et al. "Simultaneous full-color printing and holography enabled by centimeter-scale plasmonic metasurfaces." Advanced Science 7.10 (2020): 1903156.

Zhao, Zhi, et al. "Printing continuous metal structures via polymer-assisted photochemical deposition." Materials Today 37 (2020): 10-17.

Cai, W., Shalaev, V., Optical Metamaterials: Fundamentals and Applications 2010th edn, Ch. 2 (Springer, 2010).

Kumar, K. et al. Printing colour at the optical diffraction limit. Nature Nanotech. 7, 557-561 (2012).

* cited by examiner

COLOR IMAGE PRINTING BY POLYMER-ASSISTED PHOTOCHEMICAL DEPOSITION

CROSS-REFERENCE TO RELATED APPLICATION

This application claims the benefit of U.S. Patent Application 63/299,312 filed on Jan. 13, 2022, which is incorporated herein by reference in its entirety.

STATEMENT OF GOVERNMENT SUPPORT

This invention was made with government support under National Science Foundation Award Numbers 1947753, 1847324, and 1838443. The government has certain rights in the invention.

TECHNICAL FIELD

This invention relates to structural color printing technology using polymer-assisted photochemical metal deposition.

BACKGROUND

Structural color makes use of micro- or nano-structured materials to modulate the light absorption, scattering, and interference and accordingly display color. For example, plasmonic nanoantennas make use of localized surface plasmon resonance (LSPR) to engineer light absorption and scattering at sub-wavelength scale, capable of achieving ultra-high printing resolution. Dielectric (e.g. silicon, titanium oxide, etc.) nanoantennas exploit geometry-dependent electric dipole and magnetic dipole resonances that generates strong Mie resonance in the visible wavelength range, while exhibiting much lower optical losses compared to plasmonic nanostructures. To engineer optical resonance at particular wavelengths, structural color technologies based on plasmonic and dielectric nanoantennas typically require precise definition of structural dimensions at nanometer scale.

Fabry-Perot (FP) cavities, typically employing a sandwich thin-film structure including a dielectric spacer between two reflectors, produce radiation interference between the top and bottom reflectors, leading to a strong resonance in reflection magnified as a color change. These metallic and dielectric structures are more durable than organic pigments, and can be scalably produced using eco-friendly manufacturing technologies. Conventional metal-based high-quality FP cavities present a sharp absorption with a broadband non-resonant reflection as background, which leads to low brightness and poor color purity in reflection. The color saturation performance can be improved by intentionally lowering the quality factor (Q) of the cavity resonance, for example, by using an absorbing material such as germanium and nickel as the top reflector. Further, the fabrication of such a thin-film stack comprising different materials requires multiple vacuum-based deposition processes (e.g., physical vapor deposition (PVD)) in specialized facilities. This typically results in long processing times and increased costs. In addition, metal deposition processes are generally associated with high temperature, and not always compatible with organic and soft materials, thus constraining the color printing applications on flexible substrates. High-resolution printing also typically requires micro-lithography in a well-controlled cleanroom environment, which is not readily accessible and potentially costly.

SUMMARY

This disclosure describes systems and methods related to polymer-assisted photochemical deposition (PPD), as well as resulting Fabry-Perot resonance structures. PPD is a room-temperature, ambient, solution-based additive manufacturing process that can be used to create structural color pictures comprising all colors of the visible spectrum. The PPD-printed metal nanocomposite films include densely aggregated silver nanoparticles filled with a small amount (estimated <20% volume) of polymers, producing a smooth surface (roughness 2.5 nm) even better than vacuum-deposited silver films (roughness 2.8 nm) at ~4 nm thickness. Further, the printed composite films have a much larger effective refractive index n (~1.90) and a smaller extinction coefficient k (~0.92) than physical vapor deposition (PVD) ones in the visible wavelength range (400 nm to 800 nm), therefore modulating the surface reflection and the phase accumulation.

In a first general aspect, a structural color image includes a metallic layer, a nanocomposite film, and a dielectric layer between and in direct contact with the metallic layer and the nanocomposite film. The metallic layer reflects visible light. The nanocomposite film reflects visible light and includes metallic nanoparticles in a polymeric material.

Implementations of the first general aspect can include one or more of the following features.

In some cases, the metallic layer includes gold, silver, platinum, or a combination thereof. In some implementations, a thickness of the metallic layer is in a range of about 50 nm to about 250 nm. The metallic nanoparticles can include gold, silver, platinum, or a combination thereof. In some cases, a diameter of the metallic nanoparticles is in a range of about 5 nm to about 100 nm. In some implementations, the metallic nanoparticles are aggregated in the nanocomposite film. The polymeric material can include poly(allylamine). In some cases, a thickness of the nanocomposite film is in a range of about 5 nm to about 50 nm. In some implementations, the nanocomposite film includes one or more nanocomposite layers. A thickness of each layer can be in a range of about 5 nm to about 10 nm. In some implementations, a number of nanocomposite layers in a first region of the nanocomposite film differs from a number of nanocomposite layers in a second region of the film.

In some cases, the dielectric layer includes an inorganic material, an organic material, or a combination thereof. The dielectric layer can include silica. In some cases, the dielectric layer includes polymethylmethacrylate, polydimethylsiloxane, or polyethylene terephthalate. In some implementations, a thickness of the dielectric layer is in a range of about 50 nm to about 250 nm. In some cases, an observed color of the image is based at least in part on a thickness of the nanocomposite film and a thickness of the dielectric layer. A length of the nanocomposite film in a plane of the dielectric layer can be between about 5 μm and about 10 μm. In some cases, the nanocomposite layer includes less than about 25 vol % of the polymeric material. In some implementations, the root-mean-square surface roughness of the nanocomposite film is between about 1 nm and about 4 nm. An article can include the first general aspect. In some cases, the article includes an anti-counterfeit label, a colorimetric sensor, or a color membrane.

Forming the first general aspect includes positioning a substrate in a liquid composition, irradiating the liquid composition at the surface of the dielectric layer with ultraviolet radiation, thereby reducing the metal ions to yield metal nanoparticles, and coupling the metal nanoparticles to the polymeric material, thereby forming a layer of the nanocomposite film on the dielectric layer. The substrate can include the metallic layer and the dielectric layer. The liquid composition can include metal ions, a reductant, and a polymeric material.

The capability of PPD in printing both ultrathin (~5 nm) composite films and highly reflective thicker metallic film benefit design and construction of multi-layered Fabry-Perot (FP) cavity structures to exhibit vivid and saturated colors. Programmed printing of complex pictures of different color schemes and at a high spatial resolution of ~6.5 μm can be demonstrated by three-dimensionally modulating the top composite film geometries and dielectric spacer thicknesses (75 nm to 200 nm). PPD-based color picture printing can be implemented on a wide range of substrates, including glass, PDMS, and plastic, and is therefore suitable for applications from security labelling to color displays. PPD is cost-effective and can be implemented without the use of photolithography, vacuum deposition, or etching.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes systems and methods related to polymer-assisted photochemical deposition (PPD), as well as the resulting structures. In one embodiment, a PPD process is used to form metallic layers in a Fabry-Perot (FP) cavity. The FP cavity, which typically includes a dielectric spacer between two metal layers, generates radiation interference effects from incident radiation that can be tuned to produce selected colors. The PPD process is a room-temperature, non-toxic, solution-based additive manufacturing (AM) process that can produce ultrathin (~5 nm) and smooth films as the top FP absorptive reflector and also thick and reflective films as the back FP reflector. The resulting AM produced metal-dielectric-metal FP structures exhibit vivid and saturated colors from blue to green and red on a variety of substrates, including glass, silicones, and plastics.

The PPD process uses ultraviolet (UV) radiation to photoreduce metal ions in the presence of a polymeric material. The reduced metal forms nanoparticles that are coupled by the polymeric material to form a nanocomposite film. The spatial location of the film formation can be selected by controlling the position and the intensity of the radiation. As described herein, the PPD process is capable of direct structure writing with a spatial resolution down to 6.5 μm, and can be used in anti-counterfeit labels, colorimetric sensors, flexible structural color membranes, and decorations.

Figure 1:
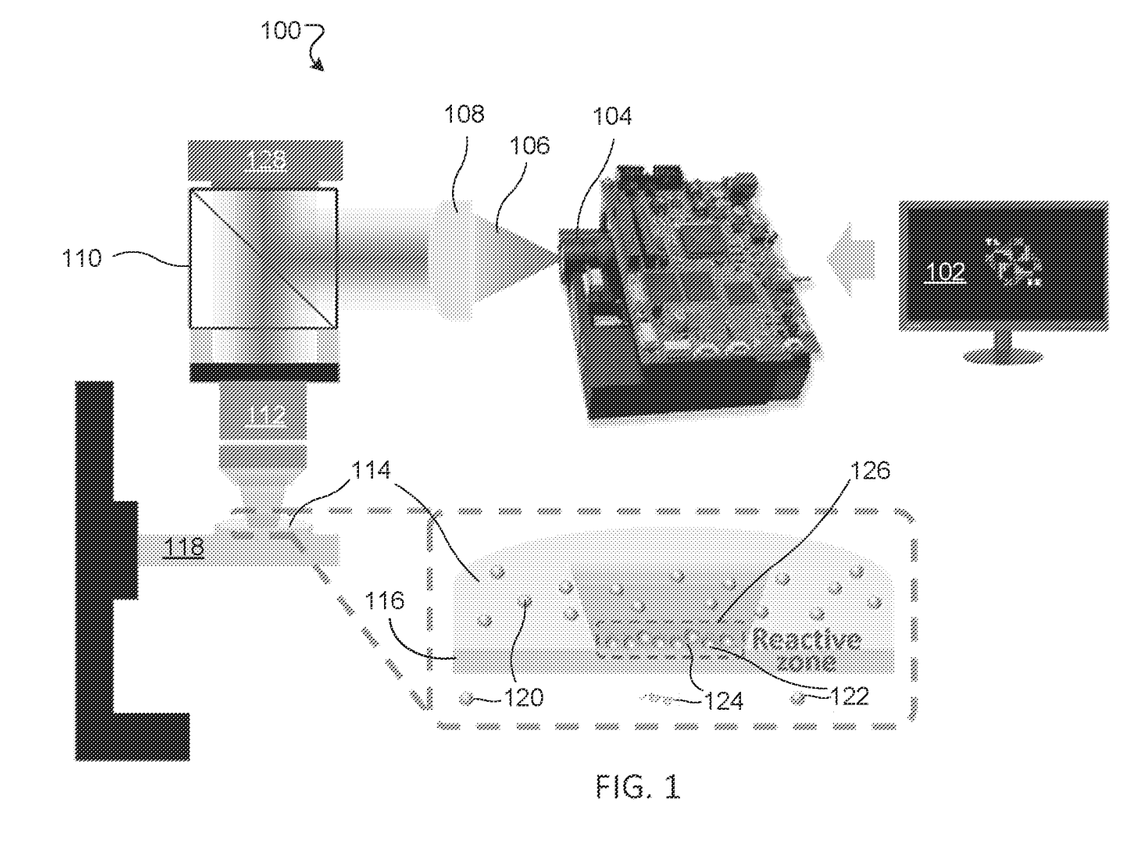
FIG. 1 is a schematic illustration of an embodiment of a polymer-assisted photochemical deposition (PPD) printing system.

Metal thin-film deposition can be performed at room-temperature using a PPD system, such as PPD system 100 shown in FIG. 1. The PPD system 100 can be used to print different metals (e.g., gold, silver, and platinum). Printing patterns are designed using software executed by processor 102. A radiation source 104 produces ultraviolet radiation 106. The ultraviolet radiation 106 passes through lens 108 and beam splitter 110, and is focused through objective 112 onto liquid composition 114 positioned on substrate 116 supported by motorized stage 118.

The inset in FIG. 1 depicts the irradiation of liquid composition 114 by ultraviolet radiation 106. The liquid composition 114 includes a metal salt, a reductant, and a polymeric material. Ultraviolet irradiation of liquid composition 114 photo-oxidizes the reductant. Electrons from the photo-oxidized reductant reduce the metal ions 120 to metal atoms having an oxidation state equal to 0. The metal atoms nucleate in solution to form metal nanoparticles 122. The diameter of the metal nanoparticles can be in a range of about 5 nm to 100 nm. The polymeric material 124 couples to the surface of the metal nanoparticles 122 to form a nanocomposite film 126. As used herein, "coupled" generally refers to adsorption of the polymer to the surface of the metal nanoparticles. The adsorption can include physical adsorption by electrostatic and van der Waals forces, chemical adsorption by covalent bonding, or a combination thereof.

In one example, radiation source 104 is an ultraviolet dynamic light projector (DLP). Other suitable radiation sources include lasers, light emitting diodes, and mercury lamps. In one example, the ultraviolet radiation has a wavelength of about 385 nm. The spatial ultraviolet radiation intensity distribution can be controlled by a digital micro-mirror (DMD) device within the DLP, and flexibly programmed by a computer-generated layout.

In one example, the metal salt for the liquid composition 114 includes silver nitrate. In one example, the reductant includes sodium citrate dehydrate. In one example, the polymeric material 124 includes poly(allylamine) (pAAm).

With PPD system 100, the lateral dimensions of printed metallic structure can be adjusted at the micrometer scale by selectively turning on and off the ultraviolet radiation in specific DMD pixels. The nanocomposite film 126 forms in areas in which the photochemical oxidation of the reductant and reduction of metal ions occurs. The spatial radiation intensity distribution is controlled at least in part by the DMD device within the DLP 104, according to the software executed by processor 102. The radiation pattern guides the nanocomposite film growth at targeted areas and in designed shapes. The PPD system 100 can be used to control the film thickness at the nanometer level by controlling a duration of irradiation and a growth rate of the film. The duration of irradiation at a given lateral position is typically in a range of about 10 seconds to about 10 minutes. The growth rate of the film is controlled by PPD system parameters including radiation wavelength, radiation intensity, and identity and concentration of the metal salt, reductant, and polymeric material. The PPD system 100 can be used to control the three dimensional design of the printed structures. The camera 128 can be used to register images of printed shapes.

The capability of the PPD system 100 with precise control in both lateral and vertical dimensions is particularly advantageous for the creation of an asymmetric Fabry-Perot (FP) cavity to display multiple structural colors. A FP cavity structure as described herein can be used to form the structural color image 200 shown in FIGS. 2A and 2B. The structural color image 200 includes a metallic layer 202, a nanocomposite film 204, and a dielectric layer 206 between the metallic layer 202 and the nanocomposite film 204. The dielectric layer 206 can be in direct contact with the metallic layer 202, the nanocomposite film 204, or both.

Figure 2A:
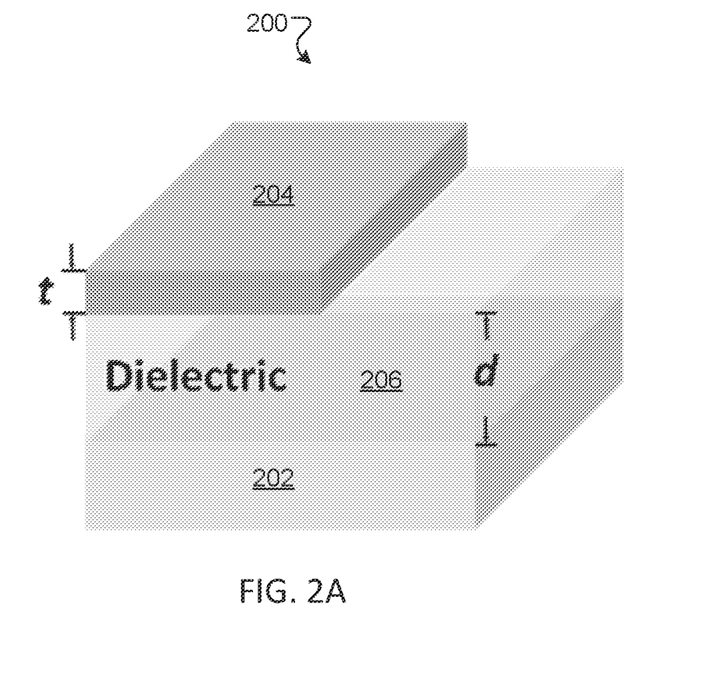
FIG. 2A is a perspective view of a Fabry-Perot (FP) cavity.
Figure 2B:
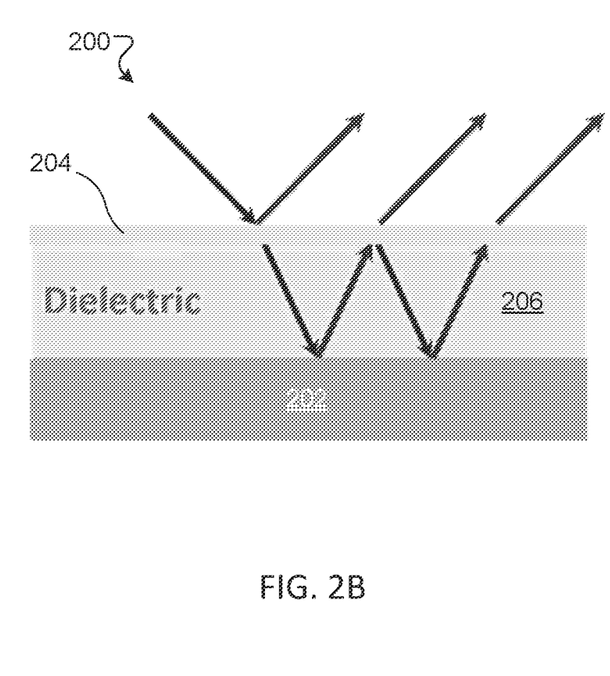
FIG. 2B depicts the interference of radiation in the FP cavity.

As used herein, "metallic" generally refers to metal-containing. In some cases, "metallic" refers to an elemental metal or an alloy thereof. In some cases, the metallic layer 202 includes gold, silver, platinum, or a combination thereof. The metallic layer 202 typically has a thickness in a range of about 50 nm to about 250 nm.

The nanocomposite film 204 transmits and reflects visible light. The nanocomposite film 204 includes metallic nanoparticles in a polymeric material formed, for example, by the PPD system depicted in FIG. 1. The observed color of the image is based at least in part on a thickness t of the nanocomposite film 204 and a thickness d of the dielectric layer 206. The nanocomposite film 204 can have a thickness t in a range of about 5 nm to about 50 nm or about 5 nm to about 20 nm. The thickness t of the nanocomposite film 204 typically affects both the reflection from and the transmission into the FP cavity. The film thickness t can modulate the interference effects in the FP cavity, shifting both the amplitude and resonance of reflected light. The nanocomposite film 204 can have a length in a plane of the dielectric layer between about 5 μm and about 10 μm. In some cases, the nanocomposite film 204 has a root-mean-square surface roughness in a range of about 1 nm to about 4 nm. The nanocomposite film 204 can include less than about 25 vol % of the polymeric material.

The dielectric layer 206 can have a thickness d in a range of about 50 nm to about 250 nm. The dielectric layer 206 can be composed of an inorganic material (e.g., silica), an organic material, or a combination thereof. The dielectric layer 206 can include polymethylmethacrylate, polydimethylsiloxane, polyethylene terephthalate, or a combination thereof.

Forming the structural color image 200 includes positioning a substrate in a liquid composition. The substrate includes metallic layer 202 and dielectric layer 206. The liquid composition includes metal ions, a reductant, and a polymeric material. The liquid composition is irradiated at the surface of the dielectric layer 206 with ultraviolet radiation, thereby reducing the metal ions to yield metal atoms. Metal nanoparticles formed from the metal atoms are coupled to the polymeric material, thereby forming a layer of the nanocomposite film 204 on the dielectric layer 206.

Examples

Multicolored printing. In one example, three different colors were printed simultaneously. The three colors were produced by a background layer without the top Ag film, a middle ground layer with a very thin (e.g., <10 nm) Ag film, and a foreground layer with slightly thicker (e.g., >10 nm) Ag film. This multi-thickness film stack was produced in a single print without moving the substrate or refilling the liquid composition, but rather simply by overlaying two computer-generated image patterns in consecutive illumination steps.

Comparison with physical vapor deposition (PVD) films. Film morphology and optical response of PPD-printed ultrathin Ag films were compared to thermally evaporated physical vapor deposition (PVD) films. Atomic force microscopy (AFM) and scanning electron microscopy (SEM) imaging were used to study the morphology and surface roughness of PPD- and PVD-deposited thin films (both ~4 nm thick on fused silica substrate, and deposited at similar rate of 2.4 nm $min^{-1}$). The PPD film was found comparable to but slightly smoother (root-mean-square (RMS) surface roughness 2.5 nm) than PVD film (RMS roughness 2.8 nm). This is attributed at least in part to the fact that noble metals such as gold and silver tend to migrate on the surface and nucleate into metal nanoparticles (MNPs), resulting in relatively rough and sometimes discontinuous films when deposited at sub 20 nm by PVD. In comparison, reduced MNPs in PPD are stabilized by chemical capping agents and poly(allylamine) (pAAm) polymers, which produce continuous thin film even at sub 10 nm thickness. These phenomena were observed by SEM imaging. The reflectance spectra of both thin films was examined by UV-visible spectrometer. Despite similar reflectance in the longer wavelength range (600-800 nm), PVD film displayed a higher reflectance with a peak at 430 nm compared to PPD film, which was due to LSPR scattering of silver nanoparticles (AgNPs). These results again confirmed the formation of AgNP islands rather than continuous structures via PVD deposition. The capability of PPD to print ultrathin yet continuous films is evident in this FP cavity based color printing analysis.

To compare the optical refractive indexes (n, k) of PPD- and PVD-films, 15 nm thick Ag was prepared on fused silica substrates, and examined by UV-near infrared (NIR) spectroscopic ellipsometry. PPD film had a higher refractive index (n~1.90) and lower extinction coefficient (k~0.92) than PVD one in the visible wavelength range (400 nm-800 nm). The optical permittivity of aggregated nanoparticles behaved differently from ideal metallic films or isolated nanoparticles. This can be due to the presence of polymer (e.g. pAAm has n~1.38, k~0) residue within the printed PPD thin films, effectively forming MNPs/polymer nanocomposite with its optical properties strongly affected by the MNPs and polymer material compositions. To further analyze the printed PPD film, effective medium theory (EMT) was employed to set up a numerical model that can precisely predict the optical properties of the nanocomposite. The optical response of PPD-printed composite film can be successfully interpreted by EMT, evidenced by the fact that EMT-calculated effective permittivity agrees well with the empirical values with a filling factor of AgNPs fit as 0.81, i.e. 81% of the total volume of nanocomposites. This indicated very high concentration of AgNPs in the nanocomposite matrices.

Analysis of printing conditions. The impact of printing conditions was analyzed, particularly printing time and pixel sizes, on the structural lateral resolution and film thickness. The dielectric-coated metallic substrate used in this example was a 200 nm thick $SiO_2$ dielectric layer on 85 nm thick PVD-generated Ag back reflector. The impact of printing time (150 s to 360 s) on linewidth was analyzed using single-pixel straight lines. The printing rate on dielectric-coated metal substrate (6.5 nm $min^{-1}$) was ~2.7 times higher than bare fused silica substrate (2.4 nm $min^{-1}$). This is attributed to a ~2.5 times higher electromagnetic field intensity at the printing surface resulting from the reflection of illuminating UV light at the PVD Ag reflector, estimated from finite-difference time-domain (FDTD) simulation. Additionally, the printed lines were found to expand with increased printing time, for example, 4.6 µm at 150 s (film thickness of 8.6 nm) compared to 8.2 µm at 360 s (thickness 22.5 nm). The observed linewidth broadening is attributed to the metal structure nucleation and growth process.

The reduced MNPs in the solution can go through a diffusion process as printing proceeds, resulting in wider linewidth. It is also possible the initially printed metal lines would serve as nucleation seeds to guide subsequent metal growth at all directions, including from the line edges, which would further enhance the linewidth increase. The linewidth was also found dependent on pixel sizes. Single-pixel and two-pixel lines were significantly narrower (4.6 µm and 7.8 µm, respectively) than larger-pixel (3 to 6) ones (14 µm to 24.3 µm), despite the same printing time (150 s). This trend is consistent with the observation of Ag printing on bare fused silica. In both cases, the metal film thickness and film-stack color contrast of printed lines gradually increased with pixel size, and reached a plateau with four or more pixels. The correlation between pixel size and film thickness is a unique characteristic of this PPD process. It is attributed to the fact that the metal film growth rate is strongly dependent on the effective electromagnetic field intensity at the nucleation side, which is not only controlled by illumination but also affected by the reflection from just printed metallic thin-film structures. The optical scattering from the rougher edges is expected to be higher at narrow lines, thus decreasing the effective electromagnetic field intensity and slowing the film growth compared to wider lines. Such scattering effect, however, could become less dominant when the linewidth is significantly larger than the illumination wavelength (i.e., 20.3 µm at 4 pixels compared to 385 nm illumination). Such feature-size-dependent printing phenomena bring extra flexibility for PPD to produce multi-colored structures within a single printing process, for example by incorporating design structures of different widths and by altering the printing time.

This analysis allows calibration of film thickness at different pixel sizes and different printing time for accurate structural design in color printing. For example, four-pixel lines were printed from 50 s to 110 s with 10 s step size on the prepared dielectric (sputtered $SiO_2$) on silver substrate. The PPD-printed nanocomposite film thicknesses were examined by AFM, and displayed almost linear dependence on the printing time. The 3D profile of AFM images also indicated a much smoother surface (RMS=1.7 nm) for the ultra-thin nanocomposite film (6 nm from 70 s printing) than the $SiO_2$/silver substrate itself (RMS=3.2 nm). This can be understood from the unique PPD printing mechanism that photochemically reduced, pAAm-capped, small AgNPs (estimated 5-10 nm from AFM and SEM) could attach to the substrate surface via Van der Waals interactions, thus filling the voids with pAAm and AgNPs and favorably reducing substrate surface roughness.

Finite-difference time domain (FDTD) simulations. Finite-difference time domain (FDTD) simulations were conducted with empirically measured optical indexes of nanocomposite and dielectric ($SiO_2$) films to analyze their thickness impact on the color display. The impact of the effect of top metal film materials, i.e. PPD-printed or PVD-deposited, was analyzed using the same cavity structure, consisting of 85 nm PVD Ag back reflector at the bottom, 200 nm $SiO_2$ dielectric layer in the middle and a variable metal film thickness t (0 to 30 nm, 5 nm step size) on the top. The change in the thickness of the PPD-printed nanocomposite film directly affects both the reflection (and accordingly the transmission into the FP cavity) and also the phase accumulation. Therefore, the film thickness can strongly modulate the interference effects in the FP cavity, shifting both the amplitude and resonance of reflected light. Using 15 nm PPD film as a top layer, a broadened reflectance spectra (~300 nm at full width half maximum (FWHM)) and relatively high reflectance (98% at 670 nm) were calculated in the visible wavelength range, which facilitated high-contrast and bright color printing in selected wavelength ranges. The PPD film effectively acted as an absorptive composite material composed of concentrated absorbing AgNPs and non-absorbing pAAm polymer. This behavior differs significantly from using PVD Ag films as the top layer of the FP cavity, which was calculated to display a high reflectance with a narrower resonance in the visible wavelength range and less effective to produce saturated colors. In comparison, the predicted equivalent colors from simulated reflectance spectra were illustrated on the 1931 International Commission on Illumination (CIE) chromaticity diagram by using colorimetric transformations, shows a much broader range of color tuning by PPD printing compared to PVD film that barely displayed color differences by changing the film thickness.

FDTD simulations were conducted with various dielectric layer thicknesses (d) to obtain wider color gamut. Referring to FIG. 2A, the cavity structure was composed of 85 nm PVD Ag back reflector 202, 75 to 200 nm $SiO_2$ dielectric spacer 206 (d, 25 nm step size) in the middle, and 15 nm PPD film 204 on the top. As the $SiO_2$ thickness d increases, the resonance peak wavelength redshifted from 330 nm to 400 nm, 460 nm, 530 nm, 600 nm and 670 nm, respectively. Compared to the color tuning effect of PPD-printed metal film thickness, the dielectric layer spacer has a more pronounced impact in modulating the reflectance amplitude and resonance peak wavelengths. The predicted colors corresponding to the reflectance spectra on the CIE chromaticity diagram further indicated broader color gamut than that with varying PPD film thickness t. This can be understood as the result of a change in optical path and accumulated phase in the cavity. To visualize the printed colors, a two-dimensional color palette was created with varying $SiO_2$ dielectric layer and the top PPD film thicknesses. For example, the palette showed highly saturated vivid colors of blue, light blue, cyan, light green, orange and blood orange, respectively, as d increases while keeping t=20 nm. Distinguishable colors were also obtained by simply modifying t with the same dielectric layer, which provides more degrees of freedom for tunable color printing.

Analysis of test images. Various thicknesses of $SiO_2$ dielectric layer (d=75 nm, 150 nm, and 200 nm, respectively) were used on the 85 nm PVD Ag back reflector to analyze the color generation. The printing was carried out for 180 s (thickness~20 nm) with checkerboard patterns to characterize the spatial resolution of the PPD system for color printing. The experimentally produced colors were consistent with the simulation-predicted color palette with a spatial resolution down to 6.5 µm. The 3D profile of AFM image again confirmed a much smoother surface (RMS roughness 1.5 nm) of PPD film than sputtered $SiO_2$ dielectric layer (RMS roughness 3.2 nm) with sufficiently distinguishable micro scale features. Distinct structures were well preserved even at the corners and boundaries of neighboring areas, indicating the printing faithfully produced microstructured patterns as confirmed by SEM imaging.

Three different test images were used on dielectric-coated silver substrates. Given the layer-by-layer nature of the PPD process, the test images were divided into several layers for printing. An image was printed over an 860 µm×620 µm area on 150 nm SiO$_2$ dielectric layer as the representative for green color. To obtain the best printing quality, the printing time was set as 45 s for the first image and 210 s for the second, respectively. Additionally, a third image was printed over an area of 720 µm×450 µm on 200 nm SiO$_2$ dielectric layer to demonstrate red and orange color printing. The AFM analysis further confirmed the highly saturated and high-contrast colors were created from as thin as 4 nm PPD films. FDTD simulations were conducted with the empirically measured film thicknesses and refractive indexes to calculate the reflectance spectra, and compared to the spectra measured by UV-Vis spectrometer. The measured reflectance spectra showed large modulation in the reflectance similar to simulated spectra, despite small discrepancies possibly attributed to differences in film geometries and material properties between simulations and experiments. These results demonstrate that the PPD based structural color printing is an alternative and cost-effective solution for high-quality and micro-scaled color printing applications.

The test images described previously were achieved without photolithography, yet they still required several vacuum deposition processes for substrate preparation, since the back reflective layer was produced using PVD. To eliminate vacuum deposition altogether, PPD films were utilized to print both the bottom metal reflector and top-layer thin film, and used spin-coated poly(methyl methacrylate) (PMMA) as a dielectric layer. The reflectance from a back reflector strongly influences the FP cavity optical performance and directly affects the color saturation. The PPD-printed back reflector on the fused silica substrates was analyzed after 8 min, 9 min, and 10 min printing by UV-Vis spectrometer, using a protected silver mirror as a reference. The 8 min printed PPD film showed the highest relative reflectance (79% at 600 nm) compared to longer time (9 min and 10 min, with 77% and 74%, respectively) printed films, possibly attributed to increased surface roughness due to undesired particle growth and resultant undesired scattering loss. Therefore, 8 min printed PPD back reflector was chosen for printing on different substrate materials. The PPD back reflector was characterized by surface profiler, UV-Vis spectrometer, AFM and SEM. The film surface was smoother (RMS roughness 3.5 nm) than the PVD back reflector (RMS roughness 5.5 nm) at the same thickness (85 nm), despite lower reflectance. Then PMMA was spin-coated on the back reflector, with its thickness adjusted by changing spin coating speed. The PMMA refractive index was characterized by ellipsometry and found similar to that of SiO$_2$ in the visible wavelength range. The PMMA was solidified overnight and briefly treated by oxygen plasma prior to the top-layer metal printing. A microscale logo with a size of 410 µm×160 µm was printed on 165 nm- and 200 nm-thick PMMA layers, producing different colors with a spatial resolution of ~7 µm. Both the color saturation and printing resolution were comparable to using PVD-deposited back reflectors. A lower contrast was observed, possibly because of the lower reflectance of back reflector, which could negatively affect the optical reflectance from the FP cavity.

Printing on flexible substrates is desired in many color printing applications, yet it could be problematic when using conventional fabrication processes (e.g., PVD and photolithography) due to the instability of the substrates when exposed to vacuum, heat, or organic solvent environments. An advantage of PPD printing is its room-temperature, ambient, and solvent-free printing process that allows it to be compatible with various substrates. The FP cavity was well fabricated on flexible PET and intact with slight bending test.

Figure 3A:
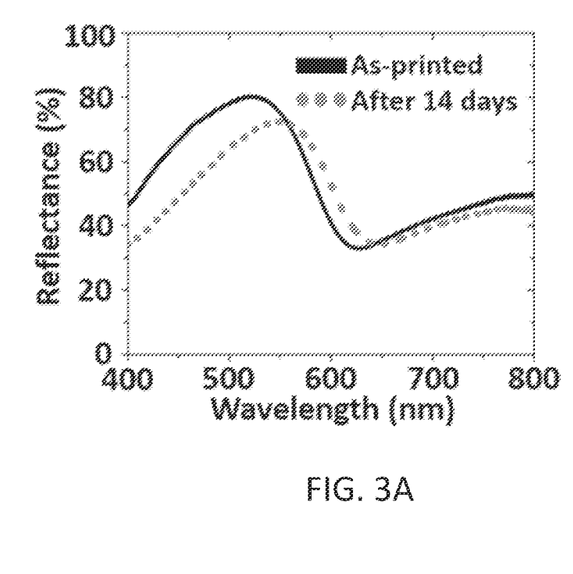
FIGS. 3A and 3B are plots showing the measured relative reflectance of images without and with a poly(methyl methacrylate) (PMMA) encapsulation layer, respectively.
Figure 3B:
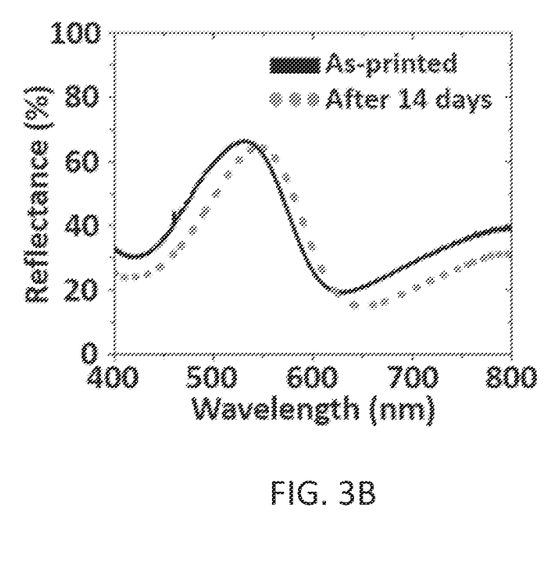
Figure 4A:
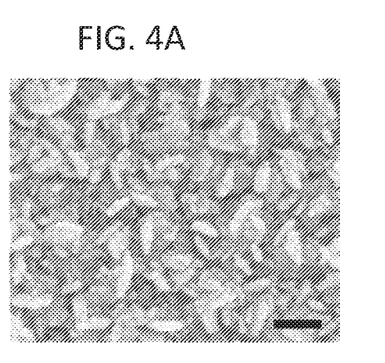
FIGS. 4A-4F are scanning electron microscope (SEM) images showing the effect of poly(allylamine) (pAAm) at various concentrations mixed with Ag liquid composition solution for printing PPD film.
Figure 4B:
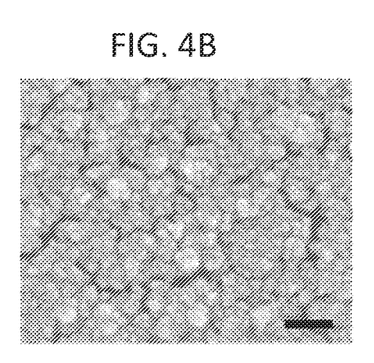
Figure 4C:
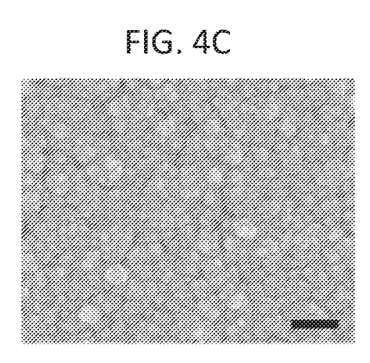
Figure 4D:
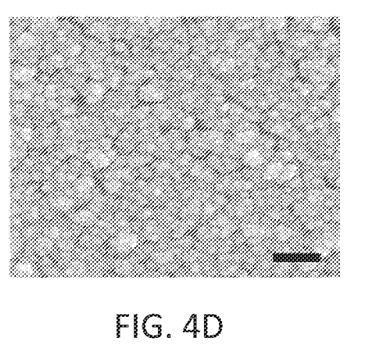
Figure 4E:
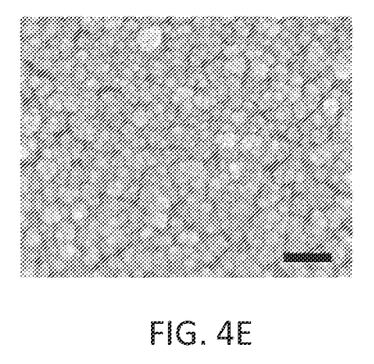
Figure 4F:
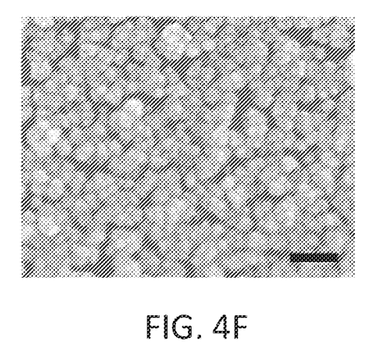

The color contrast improvement achieved using a PMMA capping layer was tested by microscopic imaging and reflectance spectroscopy. Briefly, an image was printed on two dielectric-coated silver substrates with the same film thicknesses (150 nm sputter-deposited SiO$_2$ on 85 nm evaporated Ag), then 50 nm PMMA was spin coated on the one of them as a capping layer. The microscopic images and reflectance spectra were taken immediately after color printing shown in FIGS. 3A and 3B (solid lines). The image with the PMMA capping layer exhibited more vivid color and showed larger modulation depth of reflectance spectra (FIG. 3B solid line) than the image lacking the capping layer (FIG. 3A solid line), which can be attributed to the additional interference effect between PMMA and printed Ag film. The samples were then stored in ambient condition for 14 days and images and reflectance spectra were again taken. The sample without an encapsulation layer showed a slight faded color after 14 days. From the reflectance spectra shown in FIG. 3A dotted line, the smaller modulation depth in the visible wavelength was found after 14 days due to oxidation of printed silver, which corresponded to less vivid color. On the other hand, the sample with an encapsulation layer still exhibited vivid color after 14 days in ambient condition. Although the reflectance spectra indicated a slight red-shift (FIG. 3B dotted line), probably due to the additional reaction between AgNPs and PMMA, the modulation depth was observed to be similar as the pristine color, which implied that the color was well preserved by an encapsulation layer. The spin coated PMMA layer not only acted as encapsulation layer, but also increased color saturation behavior.

Effective medium theory. In the classical model of free electron metals, the damping (γ) is determined by the scattering of the electrons with phonons, lattice defects, or impurities. However, when particle size is comparable or smaller than the mean free path of the conduction electrons in the bulk material, scattering of the conduction electrons from the particle surface results in reduced effective mean free path (L_eff) and increased 7 through the relation:

$$\gamma(L_{eff}) = \gamma_0 + \frac{A v_F}{L_{eff}} \quad (2)$$

where $\gamma_0$ is the electron relaxation rate in the bulk material, $v_F$ is the Fermi velocity and A is a dimensionless fitting parameter related to scattering. Taking account of this phenomenon, the equation to calculate the permittivity of finite-sized metal nanoparticles ($\varepsilon_{np}$) must be modified as $$\varepsilon_{np}(\omega) = \varepsilon_{bulk}(\omega) + \frac{\omega_p^2}{\omega(\omega + i\gamma_0)} - \frac{\omega_p^2}{\omega(\omega + i\gamma)}. \quad (3)$$

Here, ω is the frequency of incident light, ε bulk is the permittivity for a bulk material, and $\omega_p$ is the plasma frequency. it is assumed that AgNPs have spherical shape, hence the modified effective mean free path ($L_{eff}$=0.82R, where R is the radius of nanoparticle) is used for the calculation. In the visible wavelength range, the particle size effects are more strongly manifested in the imaginary part, while the real part indicates very minimal differences. Since the PPD film acts as the absorbing material in the FP cavity, it is advantageous to analyze the correlation between particle size and permittivity which is closely related to the absorbance of materials.

Effective medium theory (EMT) has been widely used to characterize optical properties of inhomogeneous materials, e.g. metal/polymer nanocomposites. Since the reduction and polymer-assisted aggregation of AgNPs occur simultaneously in PPD process, Bruggeman's model was used to calculate the effective permittivity ($\varepsilon_{eff}$) of PPD film. The formula for $\varepsilon_{eff}$ reads:

$$\varepsilon_{eff} = \varepsilon_p \left[ 1 + \frac{f(\varepsilon_{np} - \varepsilon_p)}{\varepsilon_p + n(1-f)(\varepsilon_{np} - \varepsilon_p)} \right] \quad (4)$$

where $\varepsilon_p = 1.91$ is the permittivity of polymer (pAAm) and f is the filling factor of AgNPs in the nanocomposite. The shape of AgNPs is very irregular in the real case, thus a shape factor n is introduced as a fitting parameter to generalize the equation. To investigate the average AgNP size, pAAm concentration dependent PPD printing was performed. FIGS. 4A-4F are scanning electron microscope (SEM) images showing the effect of poly(allylamine) (pAAm) at concentrations of 0 mM, 10 mM, 16 mM, 20 mM, 30 mM, and 40 mM, respectively, mixed with Ag liquid composition for printing PPD film (scale bar: 100 nm). Particles were observed from <5 nm to 10 nm with distinguishable contrast, particularly in 30 mM of pAAm concentration shown in FIG. 4E, which probably attributed to higher pAAm capping efficiency for AgNPs. Therefore, the average size of AgNPs was set as 10 nm in diameter for the purpose of calculating $\varepsilon_{np}$ using this model. The measured complex permittivity ($\varepsilon_m = \varepsilon_{re} + i\varepsilon_{im}$) of PPD film is obtained from the extracted spectroscopic ellipsometry data through the relations, $\varepsilon_{re} = n^2 - k^2$ and $\varepsilon_{im} = 2nk$ for real and imaginary part, respectively. When f is 0.81, calculated $\varepsilon_{eff}$ is comparable to measured $\varepsilon_m$, which implies highly concentrated AgNPs in the PPD film. Consequently, those densely packed AgNPs absorb significant amount of incident light, which yields strong modulation of reflectance spectra in the visible wavelength range.

Materials. Silver nitrate (ACS reagent, ≥99.0%), sodium citrate dihydrate (≥99.0%), allylamine (AAm, ≥99.0%), 2-hydroxy-4'-(2-hydroxyethoxy)-2-methylpropiophenone (Irgacure 2959, 98%) and trichloro(1H,1H,2H,2H-perfluorooctyl)silane were purchased from Sigma-Aldrich. PMMA (950K A4) was purchased from MicroChem. Dow Corning Sylgard 184 silicone elastomer was purchased from VWR. Polyethylene terephthalate (PET) film (PF-40/1.5-X4) was acquired from Gel-Pak. DLP® LightCrafter™ E4500 MKII™ UV (385 nm, 2 W) was purchased from EKB Technologies Ltd. Motorized stage (100 mm motorized linear translation stage, stepper motor, ¼"-20 taps) and CMOS camera (1280×1024 pixels) were purchased from Thorlabs. All chemicals used as received without further purification.

Preparation of Ag printing liquid composition. The Ag printing liquid composition was prepared by mixing silver nitrate, sodium citrate dihydrate and poly(allylamine) (pAAm). Silver nitrate and sodium citrate dihydrate solid powders were dissolved in deionized (DI) water respectively, to obtain 100 mM stock solution for each chemical. pAAm stock solution was prepared by photo-polymerization of AAm. 200 µL AAm stock solution which contained 1 M AAm and 0.57 mg mL$^{-1}$ of Irgacure 2959 was illuminated under UV light (BlueWave® 200 UV curing spot lamp, 365 nm, 3.0 W cm$^{-2}$) for 15 min. The polymerized solution was used as is. To produce Ag printing liquid composition, 80 µL silver nitrate stock solution, 60 µL sodium citrate dihydrate stock solution and 16 µL pAAm stock solution were added into 844 µL DI water. The prepared liquid composition was consumed immediately.

Preparation of substrates. Bare Si wafer was used as a substrate to prepare ultra-smooth polydimethysilane (PDMS) sheets. Self-assembled monolayers (SAMs) were formed on the substrate surface by using trichloro(1H,1H,2H,2H-perfluorooctyl)silane at 100° C. for 30 min as anti-sticking layer followed by solvent and RCA-1 cleaning. After cooling the Si substrate, a mixture of Sylgard 184 silicone elastomer and its curing agent (10:1 wt/wt) was poured onto it, degassed and further cured at 70° C. for 3 h. The prepared PDMS was gently peeled off from the substrate, cut into rectangles and transferred onto solvent-cleaned coverslip for easy handling during the printing process. The PET substrate was delaminated from commercially available Gel-film and used as is. Fused silica substrate was solvent and RCA-1 cleaned to remove absorbed organic and inorganic contaminants. All the substrates were nitrogen blown and cleaned with oxygen plasma cleaning system (Tergeo plasma cleaner, 75 W, 5 sccm) for 30 s prior to further fabrication process.

Ag and SiO$_2$ film deposition. Sub-5 nm Ag film was deposited onto fused silica substrate by thermal evaporator (Denton Benchtop turbo) to compare the quality of ultra-thin printed PPD Ag film with conventionally evaporated PVD film. Ultra-pure silver pellet (99.999% purity, Materion) was used with deposition rate of 0.4 Å s$^{-1}$, which is identical to the printed Ag deposition rate with the same thickness. This deposition was carried out without adhesion layer for a precise comparison to printed Ag film. Metal/dielectric substrate was prepared using conventional deposition process to demonstrate the feasibility of structural color printing using PPD. 3 nm chromium was evaporated as an adhesion layer, then 85 nm Ag film was deposited as back reflector onto fused silica substrate at 1.7 Å s$^{-1}$ with the same evaporator. The deposition rate was identical to printed Ag film with the same thickness. SiO$_2$ dielectric layer was deposited at 0.5 Å s$^{-1}$ using the radio frequency (RF) sputtering system (Kurt J. Lesker) with various thicknesses to adjust resonance peak of the cavity.

FP cavity based structural color printing using PPD. The aforementioned metal/dielectric substrate was used for demonstration of structural color printing. Desired printing patterns were designed in software Paint due to its pixel-based interface. A reservoir made by PDMS in the same manner as described herein was placed onto the substrate, then filled with the printing liquid composition. Designed patterns were illuminated by digital mirrors in DLP® LightCrafter™ E4500 MKII™ system (385 nm, output power of 2 W) from the top through the liquid composition using a 10× objective lens with numerical aperture (NA) of 0.3 to print Ag on the substrate surface as shown in FIG. 1. The sample height was precisely controlled by motorized stage to achieve the best printing quality. The illuminated patterns were dynamically changed by computer software after the certain amount of time for the first layer printing. After the completion of printing, the reservoir was removed from the substrate, and the substrate was rinsed with DI water and dried with nitrogen blow. To prove photolithography and vacuum deposition-free structural color printing on rigid and flexible substrates, fused silica, PDMS and PET substrates were used. 85 nm thick PPD Ag film was first printed as back reflector, then PMMA was spin coated onto printed film as dielectric layer. The substrates were left at room temperature overnight to evaporate solvent and solidify PMMA. Oxygen plasma treatment (Tergeo plasma cleaner, 25 W, 10 sccm) was employed for 30 s to make PMMA surface hydrophilic, that the printing surface became more attractive to the printing liquid composition. Finally, designed patterns were printed on the top of PMMA surface in the same manner to complete structural color printing.

Figure 5A:
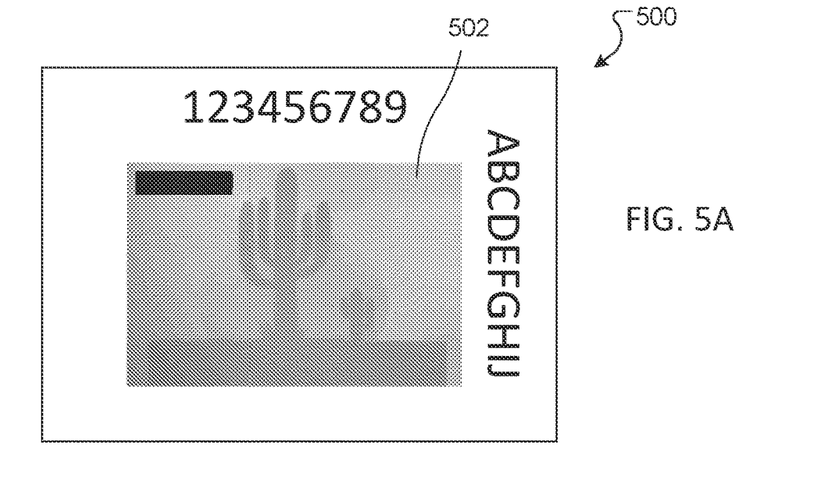
FIGS. 5A-5C depict examples of an anti-counterfeit label, a colorimetric sensor, and a color membrane, respectively, that include structural color images produced using PPD.
Figure 5B:
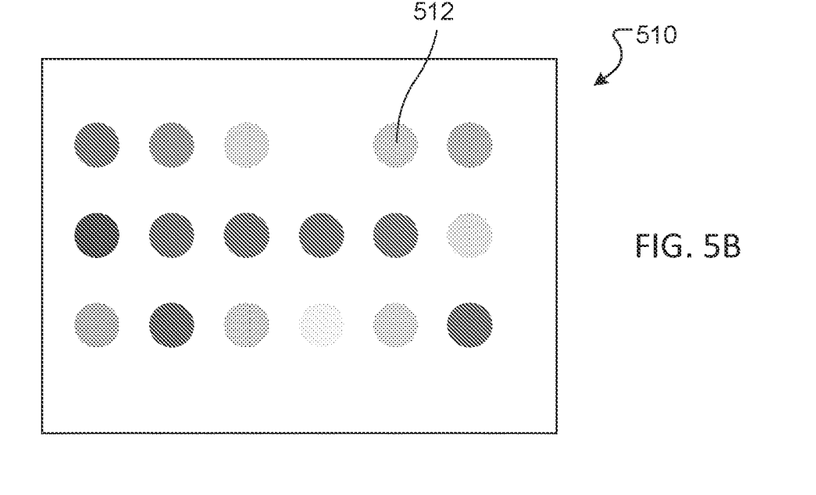
Figure 5C:
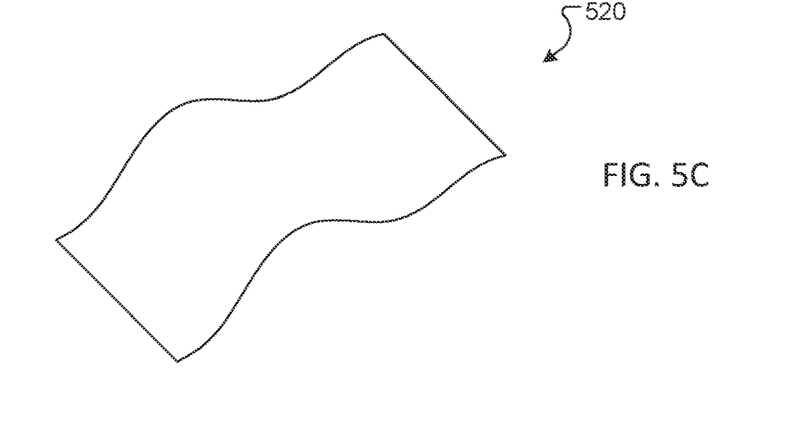

FIGS. 5A-5C depict examples of an anti-counterfeit label, a colorimetric sensor, and a color membrane, respectively, that include structural color images produced using PPD. The anti-counterfeit label 500 shown in FIG. 5A includes an image 502 that cannot easily be duplicated by other image-producing techniques and can be used to verify the authenticity of items to which the label is coupled. The capability of the PPD process to tune the color of printed FP cavities allows the fabrication of colorimetric sensors 510 such as depicted in FIG. 5B. The individual spots 512 are produced by PPD to have different colors. Each spot responds to a different analyte: the color of the spot that is activated identifies the presence of the corresponding analyte. Because the PPD process is compatible with organic and soft materials, flexible organic substrates including color membranes 520 as depicted in FIG. 5C can be produced with structural color images incorporated.

Film characterization. Atomic force microscopy (AFM, Bruker Multimode 8) was used to examine the thickness and surface roughness of both PPD and PVD films. A tapping mode was employed at ambient condition with various scan size and at a scan rate of 1 Hz. The detailed surface morphology was inspected by scanning electron microscopy (SEM, Hitachi S-4700 FESEM) with an acceleration voltage of 5 keV and current of 10 μA. A thin layer of Au/Pd was sputtered (Cressington sputter coater 108) on the samples to enhance imaging resolution prior to SEM measurements. Optical properties (refractive index n, extinction coefficient k) of PPD and PVD films and dielectric layers were measured by UV-NIR spectroscopic ellipsometry (J. A. Woollam, M-2000). Olympus BX53 fluorescent microscope coupled Horiba iHR320 imaging spectrometer was utilized to record all the optical images and reflectance spectra of fabricated samples. A protected silver mirror (Thorlabs, PF10-03-P01) was used as reference to calculate relative reflectance of the samples, which has optical reflectance over 97.5% in the visible wavelength range.

Simulation. The finite-difference time-domain (FDTD) simulations were carried out to calculate reflectance spectra in the visible wavelength range. Various thickness of printed PPD film and $SiO_2$ dielectric layer were employed to design the structural geometry of the FP cavity for structural color printing. Periodic boundary conditions (±x, ±y direction) and perfectly matched layers (±z direction, parallel to the propagation of electromagnetic waves) were used within a unit cell of 200 nm along the ±x and ±y direction. The unit cell consisted of a 85 nm thick PVD back reflector, d nm $SiO_2$ dielectric layer, and t nm PPD or PVD Ag films. The plane wave in the visible wavelength range (400-800 nm) was used as the light source, which was incident perpendicular to the unit cell. The mesh sizes were set as 2 nm along the ±x and ±y direction and 1 nm along ±z direction. The measured optical properties (n, k) of each material were used for simulation. The reflectance was monitored in the x-y plane, ~1000 nm away from the top surface of structure. Using colorimetric transformations, the simulated reflectance spectra were mapped on the CIE 1931 chromaticity diagram to display the corresponding colors. They were compared with experimental observations.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of forming a structural color image, the method comprising:
   positioning a substrate in a liquid composition, wherein the substrate comprises a metallic layer and a dielectric layer, and the liquid composition comprises metal ions, a reductant, and a polymeric material;
   irradiating the liquid composition at a surface of the dielectric layer with ultraviolet radiation, thereby reducing the metal ions to yield metal nanoparticles; and
   coupling the metal nanoparticles to the polymeric material, thereby forming a layer of a nanocomposite film on the dielectric layer to yield the structural color image.

2. The method of claim 1, wherein the metallic layer comprises gold, silver, platinum, or any combination thereof.

3. The method of claim 1, wherein a thickness of the metallic layer is in a range of 50 nm to 250 nm.

4. The method of claim 1, wherein positioning a substrate in a liquid composition occurs at room temperature.

5. The method of claim 1, wherein the dielectric layer comprises silica.

6. The method of claim 1, wherein the dielectric layer comprises polymethylmethacrylate, polydimethylsiloxane, or polyethylene terephthalate.

7. The method of claim 1, wherein a thickness of the dielectric layer is in a range of 50 nm to 250 nm.

8. The method of claim 1, wherein the metal ions are provided by silver nitrate.

9. The method of claim 1, wherein the reductant comprises sodium citrate dehydrate.

10. The method of claim 1, wherein the polymeric material comprises poly(allylamine).

11. The method of claim 1, wherein a diameter of the metal nanoparticles is in a range of 5 nm to 100 nm.

12. The method of claim 1, wherein the metal nanoparticles comprise gold, silver, platinum, or a combination thereof.

13. The method of claim 1, wherein irradiating the liquid composition occurs for a length of time in a range of 10 seconds to 10 minutes.

14. The method of claim 1, wherein a thickness of the nanocomposite film is in a range of 5 nm to 50 nm.

15. The method of claim 1, wherein the nanocomposite film comprises one or more nanocomposite layers, wherein a thickness of each layer is in a range of 5 nm to 10 nm.

16. The method of claim 1, wherein coupling the metal nanoparticles to the polymeric material comprises adsorbing the polymeric material to a surface of the metal nanoparticles.

17. The method of claim 1, further comprising depositing a capping layer on the structural color image.

18. The method of claim 17, wherein the capping layer comprises polymethyl methacrylate.

19. The method of claim 17, wherein a thickness of the capping layer is in a range of 25 nm to 75 nm.

20. The method of claim 1, wherein a spatial resolution of the structural color image is in a range of 5 μm to 10 μm.

* * * * *